United States Patent
Smith et al.

(10) Patent No.: US 10,688,583 B2
(45) Date of Patent: Jun. 23, 2020

(54) WELDING POWER SUPPLIES HAVING ADJUSTABLE CURRENT RAMPING RATES

(71) Applicant: ILLINOIS TOOL WORKS INC., Glenview, IL (US)

(72) Inventors: Alan F. Smith, Fremont, WI (US); Cody J. Bowman, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 345 days.

(21) Appl. No.: 15/582,972

(22) Filed: May 1, 2017

(65) Prior Publication Data

US 2018/0021872 A1    Jan. 25, 2018

Related U.S. Application Data

(60) Provisional application No. 62/365,768, filed on Jul. 22, 2016.

(51) Int. Cl.
  *B23K 9/10*         (2006.01)
  *B23K 9/095*        (2006.01)
  (Continued)

(52) U.S. Cl.
  CPC .......... *B23K 9/0956* (2013.01); *B23K 9/0732* (2013.01); *B23K 9/0953* (2013.01);
  (Continued)

(58) Field of Classification Search
  CPC .. B23K 9/0732; B23K 9/0953; B23K 9/0956; B23K 9/1006; B23K 9/1043; B23K 9/1062; H02M 1/08; H02M 2001/0003
  (Continued)

(56) References Cited

U.S. PATENT DOCUMENTS 4,090,057 A * 5/1978 Okada ................... B23K 9/167
                                                       219/122
6,479,794 B1   11/2002 Sykes et al.
(Continued)

FOREIGN PATENT DOCUMENTS

| EP | 2292362 | 8/2016 |
|---|---|---|
| WO | 2011147460 | 12/2011 |
| WO | 2011147461 | 12/2011 |

OTHER PUBLICATIONS

Int' Search Report and Written Opinion for PCT/US2017/039866 dated Oct. 13, 2017 (15 pages).
(Continued)

*Primary Examiner* — Sang Y Paik
(74) *Attorney, Agent, or Firm* — McAndrews, Held & Malloy, Ltd.

(57) ABSTRACT

Welding power supplies having adjustable current ramping rates are disclosed. An example welding power supply, comprising: a switched mode power supply to convert primary power to welding-type power having an output current based on a current control loop; a voltage sensing circuit to measure a weld voltage; a voltage comparator to determine whether the weld voltage corresponds to a welding arc condition or a short circuit condition; and a control circuit to: select a current ramping rate; and execute the current control loop to control the output current, the control circuit configured to, while the weld voltage corresponds to the short circuit condition, increase the output current at the current ramping rate.

21 Claims, 4 Drawing Sheets

(51) Int. Cl.
   *B23K 9/073*    (2006.01)
   *H02M 1/08*    (2006.01)
   *B23K 9/09*    (2006.01)
   *H02M 1/00*    (2006.01)

(52) U.S. Cl.
   CPC .......... *B23K 9/1006* (2013.01); *B23K 9/1043* (2013.01); *B23K 9/1062* (2013.01); *H02M 1/08* (2013.01); *H02M 2001/0003* (2013.01)

(58) Field of Classification Search
   USPC ...... 219/130.01–130.51, 136, 137 R, 137 PS
   See application file for complete search history.

(56) References Cited

U.S. PATENT DOCUMENTS

| | | |
   |---|---|---|
   | 7,304,269 B2 | 12/2007 | Fulmer et al. |
   | 2003/0111452 A1 | 6/2003 | Ihde |
   | 2005/0061791 A1 | 3/2005 | Matus |
   | 2010/0224606 A1* | 9/2010 | Hutchison ............ B23K 9/1062 219/130.21 |
   | 2011/0248012 A1* | 10/2011 | Fujiwara ................ B23K 9/092 219/137 PS |
   | 2013/0056453 A1 | 3/2013 | Fujiwara |

OTHER PUBLICATIONS

Int' Search Report and Written Opinion for PCT/US2019/023660 dated Jul. 17, 2019.

\* cited by examiner

WELDING POWER SUPPLIES HAVING ADJUSTABLE CURRENT RAMPING RATES

RELATED APPLICATIONS

This patent claims priority to U.S. Provisional Patent Application Ser. No. 62/365,768, filed Jul. 22, 2016, entitled "Welding Power Supplies Having Adjustable Current Ramping Rates." The entirety of U.S. Provisional Patent Application Ser. No. 62/365,768 is incorporated herein by reference.

BACKGROUND

This disclosure relates generally to welding systems and, more particularly, to welding power supplies having adjustable current ramping rates.

In the past, the stick welding market and, more specifically pipe welding applications, has been dominated by DC generator welding machines. The arc/welding characteristics inherent in a DC generator, which are determined by the magnetic design of the machine, provide high quality performance for pipe welding applications. The machine response can be changed by selecting taps on the DC generator magnetics and/or changing the resistance in the generator field circuit. Conventional electronic controlled inverter/high frequency switching welding power sources have not replicated the welding characteristics of a DC generator that make the DC generator attractive for stick welding applications. While the desirable behaviors are inherent in DC generators, such behaviors are not present in conventional high frequency switching welding power sources.

SUMMARY

Welding power supplies having adjustable current ramping rates are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
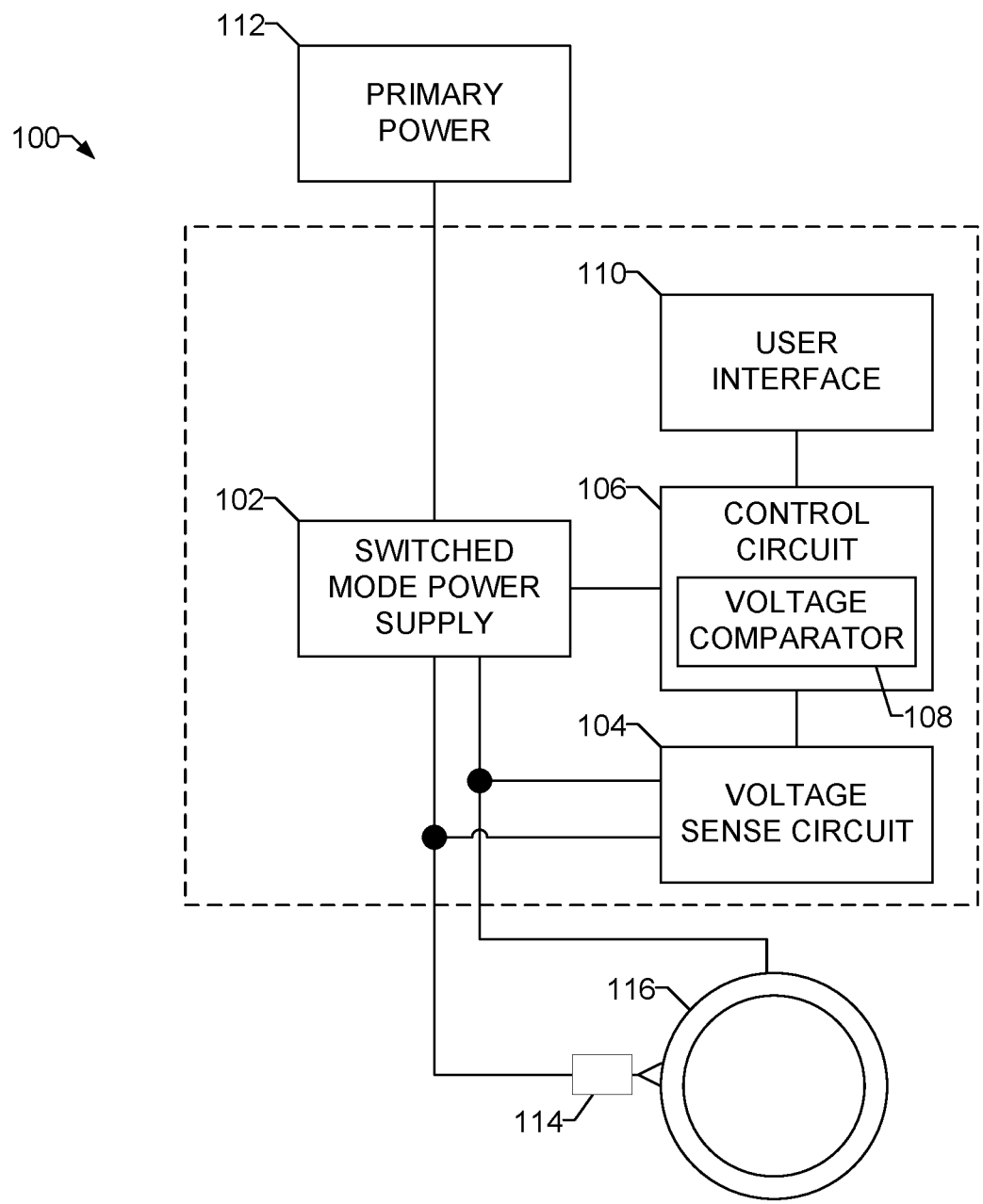
FIG. 1 is a schematic diagram of an example welding power supply having adjustable current ramping rates in accordance with aspects of this disclosure.

Disclosed examples provide a method for controlling the current response for stick welding processes. Disclosed examples control the rate of rise of current during a short circuit condition. In stick welding, a short circuit occurs as a droplet of molten metal is transferred from the end of the welding electrode to the weld pool. Disclosed examples increase the weld current during the short circuit to melt the droplet and return to a welding arc condition. The rate of rise of current determines how the molten drop pinches and is transferred from the electrode and deposited into the weld pool. Disclosed examples may be implemented in software on the weld process micro-controller to enable switched mode power supplies to provide control of dig current to mimic control of dig current that is typical of DC generators by changing the way in which the current is controlled during the weld process, specifically during a short circuit.

Conventionally, electronic/inverter welding power sources have controlled the welding current response during a short circuit by limiting the maximum short circuit current that the power source can deliver. The maximum short circuit current is controlled by the operator through what is called the "dig" control or "arc force" control. Conventionally, "dig" control or "arc force" control is accomplished through a knob or other adjustment on the user interface of the power source. Conventionally, the rate of rise of the current is fixed for inverter power supplies, and does not change as the arc force control setting (i.e., current limit) was increased or decreased.

Disclosed examples provide control over the rate of rise of the current in a short circuit condition, in addition or as an alternative to setting the upper current limit on the short circuit current. As a dig control setting is adjusted between lower and upper limits, the rate of rise of the current changes between a lower rate and an upper rate. Disclosed examples implement a current control loop in software executed by a control circuit, such as a microcontroller that controls the weld output of an inverter or switched mode power supply.

In some examples, a current ramping rate may be selected from the range of 1 Amp/ms to 500 Amps/ms. In some such examples, the current ramping rate may be selected from the range of 4 Amps/ms to 40 Amps/ms. In some examples, the ratio of the upper current ramping rate and the lower current ramping rate is between 5:1 and 500:1. When the output voltage is no longer below the dig threshold (e.g., a short circuit condition has been cleared), the integrated value of the additional current command is reset to zero and the current returns to the commanded output value.

Disclosed examples mimic the response of a DC generator and allows the operator more freedom to manipulate the weld. Disclosed examples enable a tighter arc length to be maintained in stick welding pipe joints without causing sticking of the electrode to the pipe, which gives more flexibility between the various weld conditions, joint fit-up, and other pipe joint welding parameters. Disclosed examples also improve the speed and reliability for the operator to weld a pipe joint.

In some cases, the control circuit may vary the rate of rise of current as the current increases and/or provide regions of different rates of rise of current. The dig voltage threshold could be varied and/or the current increase can be filtered using voltage feedback to provide additional control of the rate of rise of current. Additionally or alternatively, the control circuit could monitor the time of the short circuit and increasing the rate of current rise after a pre-set time has elapsed (e.g., to give the operating current time to clear small short circuits).

Disclosed example welding power supplies include a switched mode power supply to convert primary power to welding-type power having an output current based on a current control loop; a voltage sensing circuit to measure a weld voltage; a voltage comparator to determine whether the weld voltage corresponds to a welding arc condition or a short circuit condition; and a control circuit to: select a current ramping rate; and execute the current control loop to control the output current, the control circuit configured to, while the weld voltage corresponds to the short circuit condition, increase the output current at the current ramping rate.

Some example power supplies further include a user input device to receive a current ramping rate input, in which the control circuit selects the current ramping rate based on the current ramping rate input. Some such examples further include a second user input device to receive an output current setpoint, in which the control circuit, when the weld voltage corresponds to a welding arc, controls the output current based on the output current setpoint. In some examples, a ratio of a maximum value of the current ramping rate input and a minimum value of the current ramping rate input is between 5:1 and 500:1.

In some example welding power supplies, the control circuit controls the switched mode power supply to increase the output current at the current ramping rate to an upper current limit of the switched mode power supply while the weld voltage corresponds to the short circuit condition. Some such examples further include receiving a value of the upper current limit via an input device. In some examples, the voltage sensing circuit measures the weld voltage at an output of the welding power supply.

In some examples, the control circuit executes the current control loop by, in response to determining that the weld voltage corresponds to the short circuit condition: calculating a voltage error based on a difference between a reference voltage and the weld voltage; multiplying the voltage error by a value proportional to the current ramping rate to determine a current adjustment; scaling the current adjustment to determine a scaled current adjustment; integrating the scaled current adjustment into a prior value of the scaled current adjustment to determine an updated scaled current adjustment; and adding the updated scaled current adjustment to a commanded output current to determine the output current.

In some examples, the control circuit increases the output current by iteratively adding current to the output current at each execution of the current control loop. In some such examples, the current ramping rate is linear, and the control circuit adds a same amount of current to the output current at each execution of the current control loop. In some examples, the current ramping rate is non-linear, and the control circuit adds a variable amount of current to the output current at each execution of the current control loop based on at least one of the output current, a time duration of the short circuit condition, a current ramping rate input, or the weld voltage.

In some examples, the control circuit increases the output current at the current ramping rate when the weld voltage corresponds to the short circuit condition for at least a threshold time period. In some examples, the current ramping rate is between 1 amp per millisecond and 500 amps per millisecond. In some such examples, the current ramping rate is between 4 amps per millisecond and 40 amps per millisecond. In some examples, the control circuit identifies welding data corresponding to at least one of the output current, the weld voltage, a weld parameter input to the control circuit, an electrode size, or an electrode type, the control circuit being configured to select the current ramping rate based on the welding data.

In some examples, the control circuit stores weld data corresponding to a welding operation and selects the current ramping rate based on a prior welding operation. In some such examples, the control circuit selects the current ramping rate based on determining a short circuit rate from the weld data. In some examples, the voltage comparator determines that the weld voltage corresponds to the short circuit condition when the weld voltage is less than a threshold voltage.

Disclosed example non-transitory machine readable media include machine readable instructions which, when executed by a processor, cause the processor to: execute a current control loop to control a switched mode power supply to convert primary power to welding-type power having an output current; determine whether a measured weld voltage corresponds to a welding arc condition or a short circuit condition; select a current ramping rate; execute the current control loop to control the output current; and in response to determining that the measured weld voltage corresponds to the short circuit condition, increase the output current at the current ramping rate. In some such examples, the instructions cause the processor to access a current ramping rate input received from a user input device.

FIG. 1 is a schematic diagram of an example welding power supply 100 having adjustable current ramping rates. The example welding power supply 100 is a switched mode power supply 102, a voltage sense circuit 104, a control circuit 106, a voltage comparator 108, and a user interface 110. The example welding power supply 100 enables a welder to perform shielded metal arc welding (SMAW), also referred to as "Stick" welding.

The switched mode power supply 102 of FIG. 1 converts primary power 112 to welding-type power. The primary power 112 may be any suitable power source, such as utility (e.g., mains) power, engine power, and/or any combination of utility power and engine power. The welding-type power has an output current based on a current control loop. For example, the output current and/or weld voltage may be controlled based on a current setpoint and/or a voltage setpoint selected via the user interface 110. The switched mode power supply 102 outputs weld power to a weld torch 114, such as a stick electrode holder. The weld torch 114 facilitates establishing a welding arc at a workpiece 116.

The voltage sense circuit 104 measures the weld voltage. The weld voltage may refer to the output voltage of the welding power supply 100 and/or a measured arc voltage. In the example of FIG. 1, the voltage sense circuit 104 samples or measures the weld voltage at the output studs of the welding power supply 100. In some other examples, the voltage sense circuit 104 may include sense leads to measure a weld voltage at the workpiece 116 and/or at another location in the weld circuit.

The measured weld voltage is passed through an analog filter circuit. An example filter is a 4th order filter with a corner frequency of 4 KHz. The output voltage feedback is supplied to the control circuit 106. The voltage sense circuit 104 and/or the voltage comparator 108 may implement an analog-to-digital converter to convert the voltage to a digital value. The control circuit 106 also filters the voltage feedback via software, firmware, and/or hardware.

The voltage comparator 108 of the control circuit 106 determines whether the weld voltage corresponds to a welding arc condition or a short circuit condition. For example, the voltage comparator 108 may determine that the weld voltage corresponds to the welding arc condition (e.g., that there is a welding arc occurring) when the weld voltage is at least a threshold voltage, and determine that the weld voltage corresponds to the short circuit condition (e.g., there is a short circuit between the electrode and the workpiece) when the weld voltage is less than the threshold.

The control circuit 106 controls the output current and/or weld voltage output by the switched mode power supply 102 using a current control loop. The user interface 110 may include a user input device to receive an output current setpoint. The control circuit 106 executes the current control loop based on the voltage information provided by the voltage sense circuit 104, including whether a short circuit condition is detected. When the weld voltage corresponds to a welding arc (i.e., no short circuit condition), the control circuit 106 controls the output current output by the switched mode power supply 102 based on the output current setpoint.

In some examples the current control loop is implemented by the switched mode power supply 102. The voltage comparator 108 and the calculations to increase the current are implemented in software executed by the control circuit 106, which outputs a current command as an output to the current control loop implemented by the switched mode power supply 102. In some other examples, the current control loop is implemented in software executed by the control circuit 106, which controls the weld output of the switched mode power supply 102.

In some examples, the control circuit 106 selects a current ramping rate based on a current ramping rate input. The current ramping rate input may be received from the user interface 110. For example, the user interface 110 may include a dig current ramping rate control or an "Arc Force" input device to enable a user to select or tune the current ramping rate. In some examples, the user interface 110 input device mimics a tap selection and tuning selection typically found on DC generator type welding power supplies. In the example of FIG. 1, the control circuit 106 executes the current control loop at a rate of at least 15 kilohertz (kHz).

Additionally or alternatively, the user interface 110 may enable selection of different stick welding operations, such as 6010 stick rod welding, 7018 stick rod welding, downhill pipe welding, or the like, as the current ramping rate input. The control circuit 106 may select a predetermined current ramping rate based on the selected stick welding operation.

In some examples, the control circuit 106 may automatically identify the stick welding operation (e.g., rod type) and select the predetermined current ramping rate based on the stick welding operation. The control circuit 106 may identify a particular rod type by, for example, reading an identifier attached to the rod and/or observing characteristics of the weld such as frequency and/or duration of short circuit events. For example, certain types of stick electrodes may result in short circuit events occurring within a range of frequencies.

In some examples, the control circuit 106 identifies welding data corresponding to the output current, the weld voltage, a weld parameter input to the control circuit 106, an electrode size, and/or an electrode type. The control circuit 106 may select the current ramping rate using the welding data as the current ramping rate input. For instance, a welder may specify a size and/or type of stick electrode via the user interface 110. In response, the control circuit 106 identifies and selects a pre-tuned current ramping rate for use with the specified electrode.

In some examples, the control circuit 106 stores weld data corresponding to a welding operation (e.g., one or more prior welding operations performed by an operator). The control circuit 106 may select the current ramping rate using the stored data as the current ramping rate input. For example, the stored weld data may indicate how many short circuits occur during a time period to determine a short circuit rate. The control circuit 106 may select the current ramping rate to adapt the dig response to the short circuit rate.

Example types of current ramping rate inputs are described above. The control circuit 106 may use combinations of inputs to select the current ramping rate.

The control circuit 106 executes the current control loop to control the output current. In the example of FIG. 1, the control circuit 106 increases the output current at the current ramping rate while the weld voltage corresponds to the short circuit condition. The control circuit 106 may monitor the weld voltage during a short circuit to identify when a short circuit is about to clear. For example, when the weld voltage begins increasing (or increases for a certain number of consecutive samples), the control circuit 106 may stop increasing the current to reduce the spatter that results from clearing the short circuit.

Figure 2:
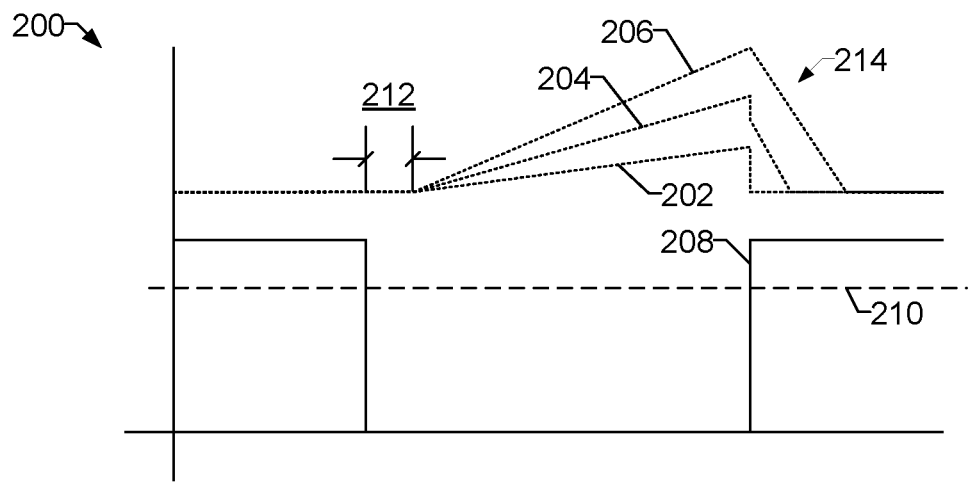
FIG. 2 is graph illustrating example current ramping rates that may be used in response to detecting a short circuit condition in a welding operation.

FIG. 2 is graph 200 illustrating example current ramping rates 202, 204, 206 that may be used in response to detecting a short circuit condition in a welding operation. The current ramping rates 202-206 may be selected and/or tuned via the user interface 110. The example control circuit 106 controls the output current of the switched mode power supply 102 until the weld voltage 208 drops below a dig voltage threshold 210.

In the example of FIG. 2, the control circuit 106 holds the output current at the current setpoint for a wetting period 212 after detecting that the weld voltage 208 decreases below the voltage threshold 210 prior to implementing the current ramping 202-206. The wetting period 212 can be static and/or adaptable based on, for example, the output current level. For example, if over time the ramping occurs frequently, reduced 212, and vice versa. Additionally or alternatively, the control circuit 106 may implement a ramp down period 214 after the short circuit is cleared (e.g., when the weld voltage 208 increases above the voltage threshold 210) prior to returning the output current to the current setpoint. For example, the current ramping rate 206 has a constant decrease in current during the ramp down period 214 to return from the peak current to the current setpoint. The current ramping rate 204 has an immediate partial step down in current and then a constant decrease in current to the current setpoint during the ramp down period 214. In some examples, instead of a constant or linear decrease in current, the control circuit 106 may implement a non-linear decrease, such as a parabolic decrease in current.

Figure 3:
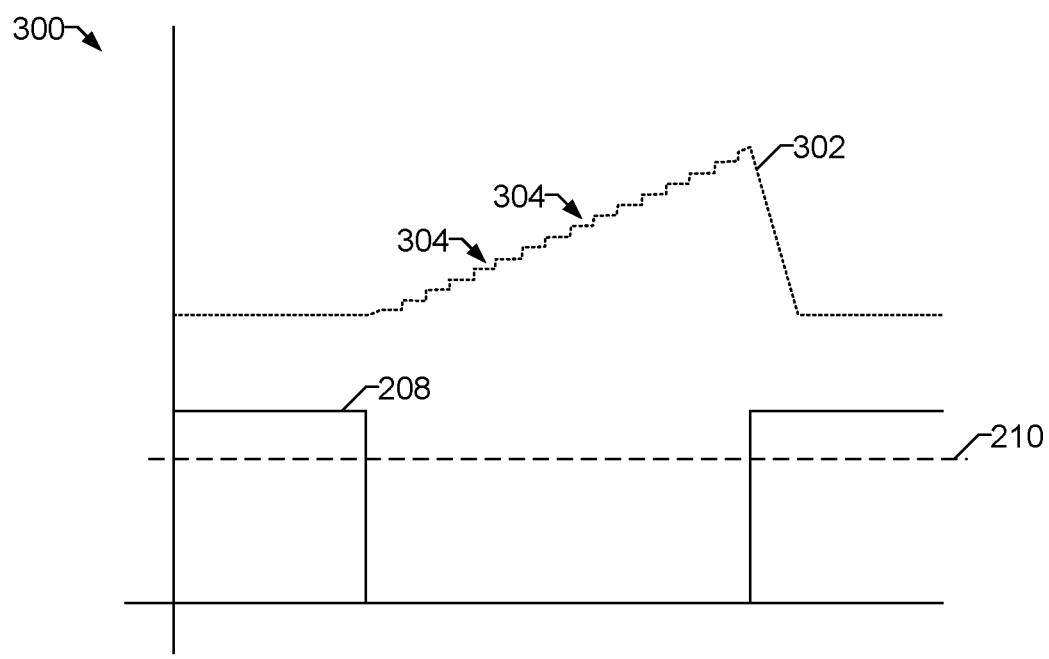
FIG. 3 is a graph illustrating an example addition of current at multiple iterations of a current control loop.

FIG. 3 is a graph 300 illustrating an example current ramp 302 in which the control circuit 106 causes additions of current at multiple iterations of a current control loop (e.g., step rises). The control circuit 106 may perform the iterative addition of current illustrated in FIG. 3 by repeatedly testing whether the short circuit condition is present based on the measured weld voltage and, while the short circuit condition remains, adding a unit of current to the current used in the prior iteration of the current control loop.

As illustrated in FIG. 3, when the weld voltage 208 decreases below the threshold weld voltage 210, the control circuit 106 responds by increasing the output current at the selected current ramping rate.

The weld voltage is monitored as feedback by the control circuit 106. When the weld voltage falls below the threshold (e.g., 19 volts) the weld voltage is subtracted from the threshold voltage to determine a voltage error (e.g., Error=19 V$-V_{feedback}$). The lowest value for $V_{feedback}$ is 0 V, so the highest value of Error is 19 V. The control circuit multiplies the voltage error by a value proportional to the "dig" or "arc force" control adjustment to determine a current adjustment. The control circuit 106 implements a scaling factor to provide the proper scaling for the output current to determine a scaled current adjustment.

The scaled current adjustment is then integrated (e.g., added into a prior value of the scaled current adjustment) to determine an updated scaled current adjustment. The effect of integrating the scaled current adjustment is to cause steps in the current as illustrated in FIG. 3. The control circuit iterates the current control loop, for example, every 100 microseconds (µs). At each iteration (e.g., every 100 µs), the control circuit 106 monitors the output voltage and, while the weld voltage remains below the voltage threshold the control circuit 106 adds the additional scaled current adjustment. The control circuit 106 controls the output of the switched mode power supply 102 to increase the output current per the commanded value. Thus, the control circuit 106 adds current at a rate that is controlled by dig or arc force setting.

Figure 4:
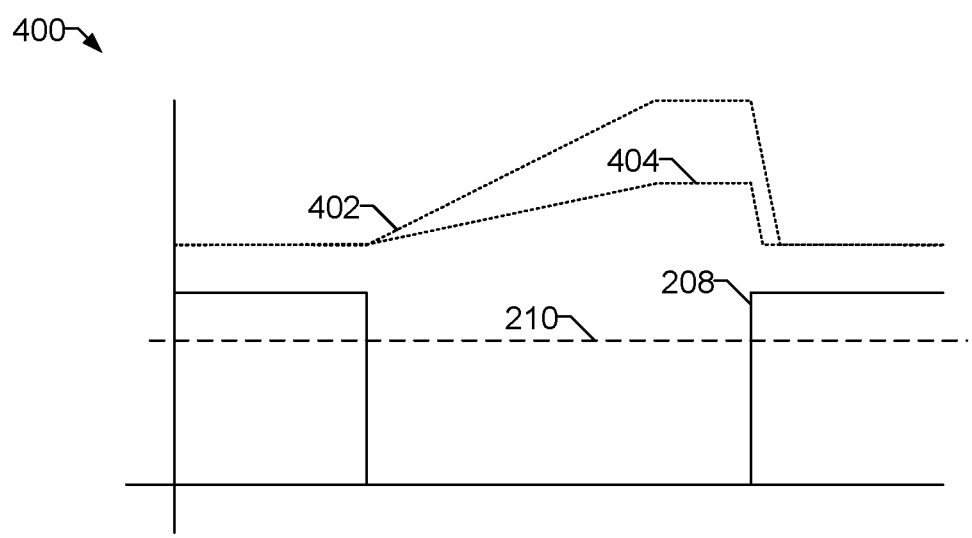
FIG. 4 is a graph illustrating example current ramping implementations.

FIG. 4 is a graph 400 illustrating example current ramping rates 402, 404. The example current ramping rate 402 of FIG. 4 increases the dig current from the current setpoint to an upper current limit at the current ramping rate. The upper current limit may be a maximum rated current of the switched mode power supply 102. Additionally or alternatively, the upper current level may be selected by the user (e.g., via the user interface 110) and/or may be calculated by the control circuit 106 based on the selected current ramping rate 402. For example, the control circuit 106 may use a relationship that sets a higher upper current limit for the higher current ramping rate 402 and a lower upper current limit for the lower current ramping rate 404.

FIGS. 2, 3, and 4 are not to scale. For example, the difference between the upper and lower currents illustrated in FIG. 3 is exaggerated to illustrate the units of current added during the current ramping.

While example current increase methods and current decrease methods are shown and described with reference to FIGS. 2, 3, and 4, other linear, substantially linear, and/or non-linear current increase functions and/or current decrease functions may be implemented. For example, current increases and/or current decreases may be exponential, step rises or falls, increasing or decreasing ramp rates after one or more threshold time period(s) during a short, and/or any other desired function.

Figure 5:
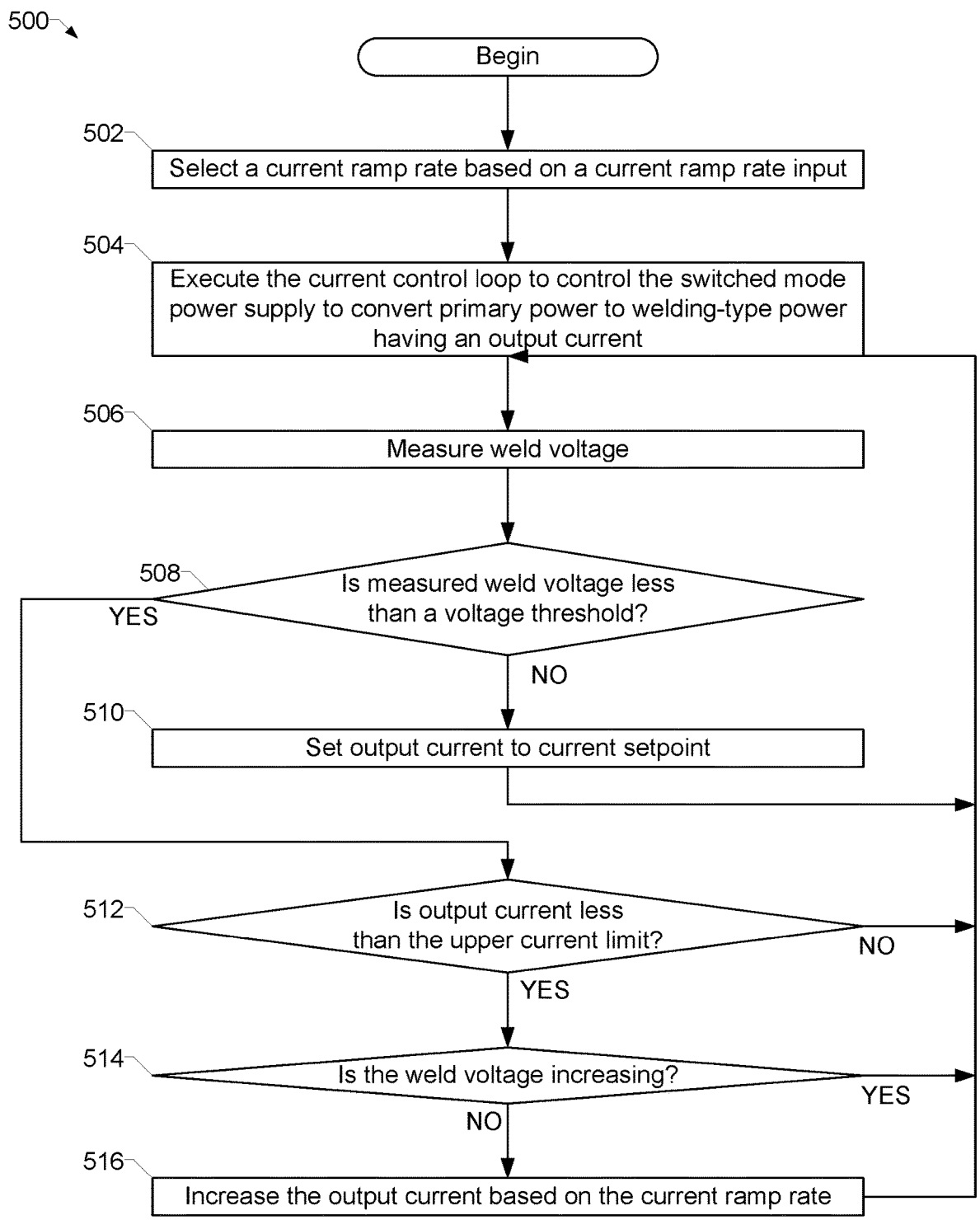
FIG. 5 is a flowchart representative of example machine readable instructions which may be executed to increase current in response to a short circuit condition, based on a selected current ramping rate.

FIG. 5 is a flowchart representative of example machine readable instructions 500 which may be executed to increase current in response to a short circuit condition, based on a selected current ramping rate.

At block 502, the control circuit 106 selects a current ramping rate (e.g., any of the current ramping rates 202, 204, 206, 302, 402, 404, of FIGS. 2-4, and/or another current ramping rate) based on a current ramping rate input. For example, the current ramping rate input may be received from a user input device in the user interface 110.

At block 504, the control circuit 106 controls the switched mode power supply 102 to convert the primary power 112 to welding-type power having an output current. The output current may be determined based on a current setpoint that is selected via the user interface 110 and controlled using a current control loop utilizing feedback. The control circuit 106 executes a current control loop to control the output current from the switched mode power supply 102. For example, the control circuit 106 may calculate a current setpoint for use by a current control loop in the switched mode power supply 102 and/or directly control the switched mode power supply 102 to output the calculated current.

At block 506, the voltage sense circuit 104 measures the weld voltage. For example, the weld voltage may be measured at an output of the power supply 100 and/or closer to the location of the arc using voltage sense leads.

At block 508, the voltage comparator 108 of the control circuit 106 determines whether the weld voltage is less than a dig voltage threshold. The dig voltage threshold represents a voltage below which the control circuit 106 enters a dig mode of operation. The dig voltage threshold may represent, for example, a detection limit for identifying the presence of a short circuit condition.

When the weld voltage is not less than the dig voltage threshold (block 508), at block 510 the control circuit 106 sets the output current to the current setpoint. For example, the control circuit 106 may drop the output current immediately to the current setpoint or may implement a ramp down period or other current decrease over time down from the dig current to the current setpoint.

When the weld voltage is less than the dig voltage threshold (block 508), at block 512 the control circuit 106 determines whether the output current is less than an upper current limit. For example, the control circuit 106 may control the switched mode power supply 102 to increase the output current at the current ramping rate up to an upper current limit. The upper current limit may be up to the maximum output current of the switched mode power supply 102.

When the output current is less than an upper current limit (block 512), at block 514 the control circuit 106 determines whether the weld voltage is increasing. If the weld voltage is increasing, the control circuit 106 may determine that the short is beginning to clear.

If the weld voltage is not increasing (block 514), at block 516 the control circuit 106 increases the output current based on the current ramping rate. For example, the control circuit 106 may calculate a current increase based on a difference between the weld voltage and the dig voltage threshold, the current ramping rate, and a current level used in a prior control loop iteration.

After increasing the current (block 516), if the weld voltage is increasing (block 514), if the output current is not less than the upper current limit (block 512), or after setting the output current to the current setpoint (block 510), control returns to block 504 to continue executing the current control loop. In some examples, the control circuit 106 waits for an interval (e.g., a wetting period) after detecting the measured weld voltage is less than the threshold voltage before first increasing the output current. Additionally or alternatively, when the weld voltage returns to a voltage above the threshold, the control circuit 106 may decrease the current at a ramp rate and/or wait during a ramp down period before returning the output current to the current setpoint level. The current decrease may be performed by one or more linear and/or non-linear ramps, one or more identical or different current steps, and/or any other decrease.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

The control circuit 106 may identify welding conditions of a given weld and automatically find the optimum value of rate of current rise for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to an engine-driven stick welder, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. The welding power supply, comprising:
   a switched mode power supply configured to convert primary power to welding-type power having an output current based on a current control loop;
   a voltage sensing circuit configured to measure a weld voltage;
   a voltage comparator configured to determine whether the weld voltage corresponds to a welding arc condition or a short circuit condition; and
   a control circuit configured to:
   select a current ramping rate; and
   execute the current control loop to control the output current to the shielded metal arc welding (SMAW) process, the control circuit configured to, while the weld voltage corresponds to the short circuit condition, increase the output current at the current ramping rate, wherein the control circuit is configured to execute the current control loop by, in response to determining that the weld voltage corresponds to the short circuit condition:
   calculating a voltage error based on a difference between a reference voltage and the weld voltage;
   multiplying the voltage error by a value proportional to the current ramping rate to determine a current adjustment;
   scaling the current adjustment to determine a scaled current adjustment;
   integrating the scaled current adjustment into a prior value of the scaled current adjustment to determine an updated scaled current adjustment; and
   adding the updated scaled current adjustment to a commanded output current to determine the output current.

2. The welding power supply as defined in claim 1, further comprising a first user input device to receive a current ramping rate input, the control circuit configured to select the current ramping rate based on the current ramping rate input.

3. The welding power supply as defined in claim 2, further comprising a second user input device to receive an output current setpoint, the control circuit configured to, when the weld voltage corresponds to a welding arc, control the output current based on the output current setpoint.

4. The welding power supply as defined in claim 2, wherein a ratio of a maximum value of the current ramping rate input and a minimum value of the current ramping rate input is between 5:1 and 500:1.

5. The welding power supply as defined in claim 1, wherein the control circuit is configured to control the switched mode power supply to increase the output current at the current ramping rate to an upper current limit of the switched mode power supply while the weld voltage corresponds to the short circuit condition.

6. The welding power supply as defined in claim 5, further comprising receiving a value of the upper current limit via an input device.

7. The welding power supply as defined in claim 1, wherein the voltage sensing circuit is configured to measure the weld voltage at an output of the welding power supply.

8. The welding power supply as defined in claim 1, wherein the control circuit is configured to increase the output current by iteratively adding current to the output current at each execution of the current control loop.

9. The welding power supply as defined in claim 8, wherein the current ramping rate is linear, and the control circuit is configured to add a same amount of current to the output current at each execution of the current control loop.

10. The welding power supply as defined in claim 8, wherein the current ramping rate is non-linear, and the control circuit is configured to add a variable amount of current to the output current at each execution of the current control loop based on at least one of the output current, a time duration of the short circuit condition, a current ramping rate input, or the weld voltage.

11. The welding power supply as defined in claim 1, wherein the control circuit is configured to increase the output current at the current ramping rate when the weld voltage corresponds to the short circuit condition for at least a threshold time period.

12. The welding power supply as defined in claim 1, wherein the current ramping rate is between 4 amps per millisecond and 40 amps per millisecond.

13. The welding power supply as defined in claim 1, wherein the current ramping rate is between 1 amp per millisecond and 500 amps per millisecond.

14. The welding power supply as defined in claim 1, wherein the control circuit is configured to identify welding data corresponding to at least one of the output current, the weld voltage, a weld parameter input to the control circuit, an electrode size, or an electrode type, the control circuit being configured to select the current ramping rate based on the welding data.

15. The welding power supply as defined in claim 1, wherein the control circuit is configured to store weld data corresponding to a welding operation, the control circuit being configured to select the current ramping rate based on a prior welding operation.

16. The welding power supply as defined in claim 15, wherein the control circuit is configured to select the current ramping rate based on determining a short circuit rate from the weld data.

17. The welding power supply as defined in claim 1, wherein the voltage comparator determines that the weld voltage corresponds to the short circuit condition when the weld voltage is less than a threshold voltage.

18. The welding power supply as defined in claim 1, wherein the control circuitry is configured to execute the current control loop to control the switched mode power supply both while the measured weld voltage is above the voltage threshold and while the measured weld voltage is below the voltage threshold.

19. The welding power supply as defined in claim 1, wherein the control circuitry is configured to execute the current control loop to control the switched mode power supply in both the welding arc condition and the short circuit condition.

20. A non-transitory machine readable medium comprising machine readable instructions which, when executed by a processor, cause the processor to:
   execute a current control loop to control a switched mode power supply to convert primary power to welding-type power having an output current and to output the welding-type power to a shielded metal arc welding (SMAW) process;
   determine whether a measured weld voltage corresponds to a welding arc condition or a short circuit condition;
   select a current ramping rate;
   execute the current control loop to control the output current to the SMAW process; and
   in response to determining that the measured weld voltage corresponds to the short circuit condition, increase the output current to the SMAW process at the current ramping rate, wherein the instructions cause the processor to execute the current control loop by, in response to determining that the weld voltage corresponds to the short circuit condition:
   execute the current control loop by, in response to determining that the weld voltage corresponds to the short circuit condition:
   calculating a voltage error based on a difference between a reference voltage and the weld voltage;
   multiplying the voltage error by a value proportional to the current ramping rate to determine a current adjustment;
   scaling the current adjustment to determine a scaled current adjustment;
   integrating the scaled current adjustment into a prior value of the scaled current adjustment to determine an updated scaled current adjustment; and
   adding the updated scaled current adjustment to a commanded output current to determine the output current.

21. The machine readable medium as defined in claim 20, wherein the instructions cause the processor to access a current ramping rate input received from a user input device.

* * * * *